Aug. 7, 1962 J. V. SHOEMAKER 3,048,445
WHEEL COVER
Filed March 24, 1958
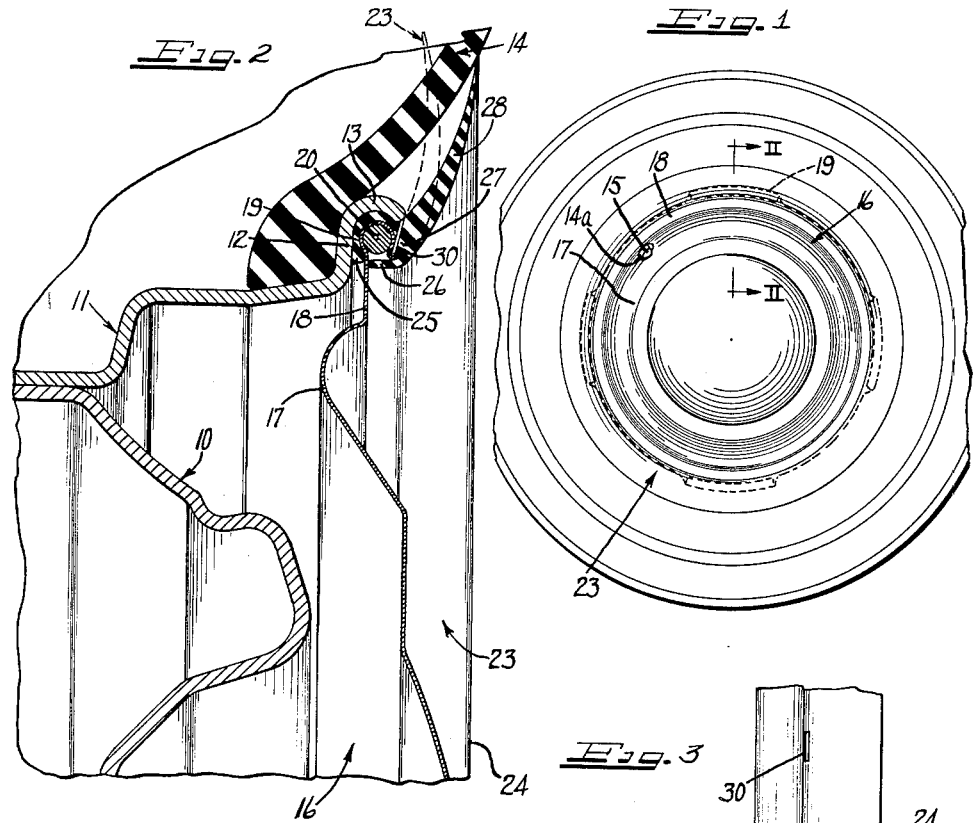
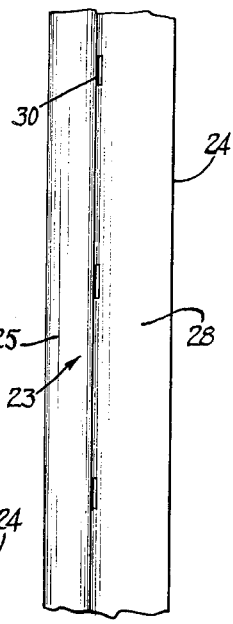
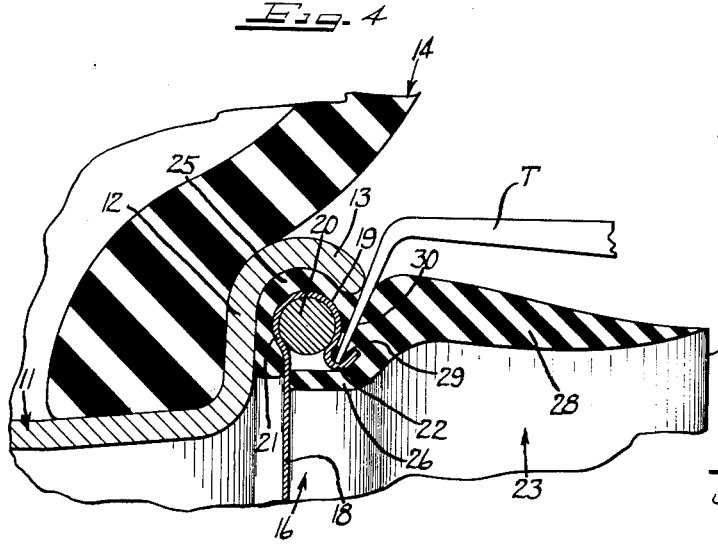
Inventor
JOHN V. SHOEMAKER

United States Patent Office 3,048,445
Patented Aug. 7, 1962

3,048,445
WHEEL COVER
John V. Shoemaker, Detroit, Mich., assignor to Lyon Incorporated, Detroit, Mich., a corporation of Delaware
Filed Mar. 24, 1958, Ser. No. 723,346
13 Claims. (Cl. 301—37)

The present invention relates to improvements in wheel structures and more particularly concerns the provision of novel means for providing a wheel with a simulated white or other colored sidewall for a tire on the wheel.

For ornamental purposes, automobile tires are commonly provided with white sidewalls, the remainder of the tire being of a more or less black appearance. The white rubber used for the white sidewall is applied as a veneer and is of a different composition from the remainder or body of the tire and actually requires a different vulcanizing treatment to the extent that the temperature and time of cure are somewhat different than for the black rubber of the tire body. This has created some necessity for compromise in the vulcanization of tires with white sidewalls, generally resulting in a sacrifice of quality in the tire.

To overcome the disadvantages of cure compromise it has been proposed to secure the white sidewall portion or veneer to the sidewall of the tire after the tire has been vulcanized. Such after-attached sidewall members are inherently liable to such disadvantages as peeling, and the like, and of course require a separate attaching or vulcanizing operation that raises costs.

It has also been heretofore proposed to provide separate simulated white sidewall ring members that are secured clampingly between the terminal flange of the tire rim and the bead portion of the tire and separably hug the sidewall of the tire. Such simulated or mock tire white sidewall rings require, of course, that the tire be deflated in order to install the ring members. Should such simulated white sidewall rings become damaged, it is necessary to deflate the tire not only to remove the damaged ring but also to replace the ring. Furthermore, a disadvantage of such simulated white sidewall rings is that, especially with tubeless tires, there is interference with proper sealing, gripping engagement of the tire bead portion with the opposing surfaces of the tire rim and more particularly the terminal flange between which end the tire bead the simulated white sidewall ring is clampingly interposed.

It is accordingly an important object of the present invention to overcome the foregoing difficulties and disadvantages of the prior expedients and to provide a simulated tire sidewall of improved appearance and which can be applied, or removed, or replaced without disturbing the tire.

Another object of the invention is to provide an improved tire sidewall simulating member which serves as means for covering the terminal rim flange.

A further object of the invention is to provide a novel tire sidewall simulating ring member, which is adapted to be so related to the outer side of the tire and the tire rim that the tire is afforded a deeper, more massive appearance.

Still another object of the invention is to provide a novel tire sidewall simulating ring member or assembly which is adapted for optional assembly with a wheel.

Yet another object of the invention is to provide a tire sidewall simulating flexible, non-metallic ring member which is adapted to be carried in clamped engagement with the outer side of a tire rim.

It is also an object of the invention to provide a non-metallic tire sidewall simulating ring device affording substantial possibilities for variable, distinctive ornamental effects.

Yet another object of the present invention is to provide a new and improved non-metallic tire sidewall simulating ring device and cover assembly whereby the ring device is overlappingly engaged with the outer margin of the cover on its axially inner and outer sides in assembly therewith.

A further object of the present invention is to provide a wheel cover and wheel balancing weight assembly whereby the weights are disposed in retaining assembly with the cover at the outer margin of the cover.

A still further object of the present invention is to provide shock absorbing means for a wheel cover in the form of a non-metallic tire side wall simulating ring device which is interposed between the cover and the wheel at the area where the cover is secured in assembly with the wheel.

Other objects, features and advantages of the present invention will be readily apparent from the following detailed description of certain preferred embodiments thereof, taken in conjunction with the accompanying drawing, in which:

FIGURE 1 is an outer side elevation of a wheel structure embodying features of the invention;

FIGURE 2 is an enlarged fragmentary cross-sectional view taken substantially on the line II—II of FIGURE 1 looking in the direction indicated by the arrows;

FIGURE 3 is a fragmentary edge elevation of the tire side wall ring member shown in FIGURE 2; and FIGURE 4 is an enlarged fragmentary cross-sectional view similar to FIGURE 2 only illustrating one manner of removing the cover and ring assembly.

Referring to the drawings, an automobile wheel including a disk spider wheel body 10 supports a tire rim 11 including an outer generally radially extending rim flange 12 and an arcuate axially extending terminal rim flange 13. A pneumatic tire 14 of preferably the tubless type is carried by the tire rim. A valve stem 15 (FIGURE 1) is provided for inflation of the tire 14.

For disposition at the outer side of the wheel and in overlying covering relation to the wheel body 10, as well as substantially concealing relation to the tire rim, there is provided a wheel cover member 16. To this end, the cover 16 includes an intermediate annular dished portion 17 disposed generally opposite the junction of the body part 10 with the rim part 11. Disposed radially outwardly of the dished portion 17 is an outer marginal cover area indicated generally at 18. Disposed at the outer peripheral edge of the margin 18 at circumferentially spaced intervals are hook-like extensions 19 which extensions are disposed substantially on the axially outer side of the cover member 16. The extensions 19 comprise a beaded outer marginal edge area. Carried in assembly with at least one of the hooks 19 on the axially outer side of the cover member 16 is a wheel balancing weight indicated generally at 20.

At the inter-section of the hook-like extension or retaining portion 19, and the cover margin 18 the hook-like portion is indented slightly axially inwardly of the cover margin 18 as indicated at 21. It will be appreciated the hook-like retaining portion 19 is arcuate in an axial direction as well as in a circumferential direction and that the wheel balancing weight 20 has a configuration complementary to the inside surface configuration of the hook-like portions 19 so as to snugly and retainingly nest there within.

Each of the hook-like retaining extensions or portions 19 terminate in a reverse bent pry-off hook 22 opening in a radially and axially outwardly extending direction. Generally speaking the hook-like extension 19 has an S-shaped configuration with the pry-off hook portion 22 opening in a manner to allow ready removal of the cover from the wheel.

Also for disposition at the outer side of the wheel and for concealing the terminal rim flange 13 and to impart to the wheel 14 the appearance of being a white or colored sidewall type of tire, a ring member indicated generally at 23 is provided. The ring member is made preferably from a rubber-like material and for which a synthetic rubber such as butyl is especially desirable. Such synthetic rubber is characterized by especially desirable form sustaining resilient flexibility, good color qualities and excellent durometer control.

For affording tire sidewall simulating shape for the ring member 23, it is of generally axially outwardly curved transverse or radial shape terminating in a thin, and in this instance, substantially feather edge radially outer extremity 24 engageable against the sidewall of the tire 14 with a fine line generally merging effect so that the ring member appears on the wheel as though it were an integral sidewall portion of the tire. The outside diameter of the ring member 23 at the tire engaging edge 24 thereof, is such that the edge 24 engages the tire sidewall on the incurve of the outer sidewall, with a substantial sidewall portion radially outwardly beyond the point of contact disposed in protective overlying relation to the sidewall ring member.

At its radially inner margin, the sidewall ring member 23 is provided with means for retaining interengagement with the wheel cover member 16 and with the tire rim 11. To this end, the inner margin of the ring member 23 is constructed as an annular flange having annular axially inner and axially outer flaps 25 and 26 which are joined together at a junction portion 27 which is connected to an intermediate portion 28 which links the inner margin of the ring member 23 with the outer edge area 24. As will be noted in FIGURE 2, the intermediate portion is for the most part axially spaced from the tire 14 except at its point of engagement at its outer edge area 24.

To assemble the components of the cover assembly together, the wheel balancing weight or weights are assembled with the cover member and particularly are telescoped internally of the hook-like portion or portions indicated generally at 19 in assembly therewith. The hook-like portions 19 may be constructed so as to have an inside diameter slightly smaller than the outside diameter of the wheel balancing weight 20 so that the hook-like portion 19 must be sprung to enable the wheel balancing weight 20 to be telescoped therein. Thus when the weight is telescoped in assembly with the hook-like portion 19, the wheel balancing weight 20 is sustained in assembly under the tension exerted by the sprung hook-like portion 19.

Thereafter, the flaps 25 and 26 are nestingly engaged about the outer circumferentially spaced retaining hook-like portions 19 as well as a portion of the annular outer margin 18 of the cover 16. It is in this manner that the flaps operate to grasp the outer margin of the cover.

As will be noted most clearly in FIGURE 4, the ring member 23 is provided with a series of finger-like portions 29 each of which are telescoped and nestingly engaged within the groove defined at the radially and axially outer side of the hook portion 22.

The assembly as above described may be placed in retaining engagement upon the wheel by aligning the cover member 16 and the ring member 23 with respect to the wheel and moving the cover member 16 and ring member 23 axially inwardly causing the material of the axially inner flip 25 to be displaced slightly to enable the cover member 16 and the ring member 23 to be retainingly sustained upon the wheel. It is in this manner that the material of the ring acts as a sound deadener between the wheel and the cover member. It will be understood of course that during the assembly of the ring and cover on the wheel the valve stem will be telescoped through cover opening 14a.

It will also be appreciated during the assembly operation the hook portions 19 may also be sprung slightly in a manner to place them under a degree of tension so as to assist in the retention of the cover and the ring member in assembly with the radial and terminal rim flanges 12 and 13.

During the assembly of the ring member 23 on the wheel the ring member is caused to be deflected out of the dotted line position shown in FIGURE 2 into the full line position there shown. It is in this manner that the outer marginal edge area 24 is placed under a slight degree of tension with respect to the tire sidewall 14.

Removal of the assembly may be brought about by grasping the outer margin of the ring member 23 and pulling it radially inwardly and thereafter inserting a pry-off tool indicated at T in FIGURE 4 into a grove or channel indicated generally at 30 in a manner whereby the tip of the tool is engaged with the smaller of the hook portions 22 so that an intermediate portion of the tool may be fulcrumed on the outer tip edge of the terminal rim flange 13. Thus by forcing the outer handle of the tool generally radially outwardly the tension of the hook-like retaining portions 19 may be released to enable the ring member 23 and the cover member 16 to be removed from the wheel.

Another manner in which the cover member 16 and the ring member 23 may be removed from assembly with the wheel is by prying the flap 26 at its axially inner end out of engagement with the cover margin 18 whereupon the flap 26 may be grasped and pulled away from the hook-like portion 22 so that a pry-off tool may be applied to the hook portion 22.

By using a tool of a type which may grasp the hook portion 22 the retaining portions 19 may be caused to be disengaged by applying a radially inwardly and axially outwardly pry-off force to the tool.

The relationship of the ring flaps 25 and 26 in the illustrated form may be such that the inner ring margin and one or more of the flaps may be elastically stretched and moved to allow the hook portions 19 to be disposed therebetween with the flaps being sustained out of their normal position in snug frictional assembly with the hook portions 19.

If it is desired that the ring member 23 be applied to the wheel before it is assembled with the cover member 16, the inner margin is stretched with the axially inner radially outer surface area of the flap 25 being elastically stretched and engaged under tension in snug assembly with the rim flanges 12 and 13. In this event the cover 16 may be secured to the wheel by lifting the annular flap 26 and pressing the cover member axially against the inner flap 25 whereupon the flap 26 is released and allowed to snap back and secure the cover against axial displacement. In this event the cover may or may not be of the resilient type with the action of the flaps being of such nature as to sustain the cover in assembly therewith.

In conclusion, it will be appreciated that the cover member 16 may be made from any suitable material such as spring steel and that any suitable member of retaining portions or hooks 19 may be employed with four retaining portions 19 being shown in the illustrated form of the invention in FIGURE 1.

It will be understood that modifications and variations may be effected without departing from the scope of the novel concepts of the present invention.

I claim as my invention:

1. In a wheel structure including a pneumatic tire and a tire rim having a radial rim flange connected to an axial terminal rim flange, a wheel cover section overlying the wheel having a beaded outer marginal edge area, a tire side wall ring simulating member bridged over the terminal rim flange having its radially outer terminal engaged against the tire and having a bifurcated inner marginal edge area including axially inner and outer deflectable flaps retainingly engaged in assembly with the beaded outer marginal edge area and with the outer flap concealing the beaded outer marginal edge area, and means cooperable with the wheel for sustaining the cover section and ring member in assembly with the wheel, the inner flap being disposed in radially confronting relation to the terminal rim flange in retained engagement therewith.

2. In a wheel structure including a pneumatic tire and a tire rim having a radial rim flange connected to an axial terminal rim flange, a wheel cover section overlying the wheel having a beaded outer marginal edge area, a tire side wall ring simulating member bridged over the terminal rim flange having its radially outer terminal engaged against the tire and having a bifurcated inner marginal edge area including axially inner and outer deflectable flaps retainingly engaged in assembly with the beaded outer marginal edge area and with the outer flap concealing the beaded outer marginal edge area, said marginal edge area comprising circumferentially spaced resiliently deflectable hooks for cover retaining assembly with the tire rim the inner flap being disposed in radially confronting relation to the terminal rim flange held in retained engagement therewith by said hooks engaged against the radially inner side of said inner flap.

3. In a wheel structure including a pneumatic tire and a tire rim having a radial rim flange connected to an axial terminal rim flange, a wheel cover section overlying the wheel having a beaded outer marginal edge area, a tire side wall ring simulating member bridged over the terminal rim flange having its radially outer terminal engaged against the tire and having a bifurcated inner marginal edge area including axially inner and outer deflectable flaps retainingly engaged in assembly with the beaded outer marginal edge area and with the outer flap concealing the beaded outer marginal edge area, said marginal edge area comprising circumferentially spaced resiliently deflectable hooks for cover retaining assembly with the tire rim, the hooks securing the cover section as well as the ring simulating member in assembly with the terminal rim flange, said inner flap being engaged with the radial and axial terminal rim flanges and the hooks for cushioning the cover in its assembly with the wheel and for sustaining the ring simulating member on the wheel, the inner flap being disposed in radially confronting relation to the terminal rim flange and being held in retained engagement therewith by said hooks which hooks are engaged against the radially inner side of said inner flap.

4. In a wheel structure including a pneumatic tire and a tire rim having a radial rim flange connected to an axial terminal rim flange, a wheel cover section overlying the wheel having a beaded outer marginal edge area, a tire side wall ring simulating member bridged over the terminal rim flange having its radially outer terminal engaged against the tire and having a bifurcated inner marginal edge area including deflectable flaps retainingly engaged in assembly with the beaded outer marginal edge area and with the axially outer flap concealing the beaded outer marginal edge area, said marginal edge area comprising circumferentially spaced resiliently deflectable hooks for cover retaining assembly with the tire rim, said hooks each having a pry-off portion and with the inner margin of the ring simulating member having channeled areas in alignment with the pry-off portions to enable a pry-off tool to be projected through the ring margin and engaged against the pry-off portion to release the tension between the hooks and the tire rim.

5. In a wheel structure including a pneumatic tire and a tire rim having a radial rim flange connected to an axial terminal rim flange, a wheel cover section overlying the wheel having a beaded outer marginal edge area, a tire side wall ring simulating member bridged over the terminal rim flange having its radially outer terminal engaged against the tire and having a bifurcated inner marginal edge area including deflectable flaps retainingly engaged in assembly with the beaded outer marginal edge area and with the axially outer flap concealing the beaded outer marginal edge area, said marginal edge area comprising circumferentially spaced resiliently deflectable hooks for cover retaining assembly with the tire rim, said hooks defining weight retainers and with a wheel balancing weight held in assembly with the hook.

6. In a wheel structure including a pneumatic tire and a tire rim having a radial rim flange connected to an axial terminal rim flange, a wheel cover section overlying the wheel having a beaded outer marginal edge area, a tire side wall ring simulating member bridged over the terminal rim flange having its radially outer terminal engaged against the tire and having a bifurcated inner marginal edge area including deflectable flaps retainingly engaged in assembly with the beaded outer marginal edge area and with the axially outer flap concealing the beaded outer marginal edge area, said marginal edge area comprising circumferentially spaced resiliently deflectable hooks for cover retaining assembly with the tire rim, said hooks defining weight retainers and with a wheel balancing weight held in assembly with the hook, said hooks being disposed on the axially outer side of the cover section opening radially inwardly and with the outer flap concealing the hooks but being deflectable to provide access to the wheel balancing weight.

7. A wheel cover member for overlying disposition upon a wheel, the cover member having an outer marginal cover area provided with circumferentially spaced retaining portions disposed radially outwardly of the outer marginal area with the retaining portions having a diameter slightly smaller than the inside diameter of the terminal rim flange of a tire rim so as to lie in radially spaced relation when the cover member is applied against the wheel, and a non-metallic tire side wall ring simulating member having means for engaging the outer marginal area of the cover and the retaining portions, the retaining portions being adapted to coact with the ring simulating member for sustaining both the cover and the ring members in assembly with the wheel.

8. A wheel cover member for overlying disposition upon a wheel, the cover member having an outer marginal cover area provided with circumferentially spaced retaining portions disposed radially outwardly of the outer marginal area with the retaining portions having a diameter slightly smaller than the inside diameter of the terminal rim flange of a tire rim so as to lie in radially spaced relation when the cover member is applied against the wheel, said retaining portions not only disposed radially outwarly of the outer marginal area of the cover member but additionally being disposed substantially in their entirety on the axially outer side of the cover, and a non-metallic tire side wall ring simulating member having means for engaging the outer marginal area of the cover and the retaining portions, the retaining portions being adapted to coact with the ring simulating member for sustaining both the cover and the ring members in assembly with the wheel.

9. A wheel cover member for overlying disposition upon a wheel, the cover member having an outer marginal cover area provided with circumferentially spaced retaining portions disposed radially outwardly of the outer marginal area with the retaining portions having a diameter slightly smaller than the inside diameter of the terminal rim flange of a tire rim so as to lie in radially spaced relation when the cover member is applied against the wheel, said retaining portions not only disposed radially outwardly of the outer marginal area of the cover member but additionally being disposed substantially in their entirety on the axially outer side of the cover, said retaining portions being of a hook-shaped configuration and each being resilient deflectable, and a non-metallic tire side wall ring simulating member having means for engaging the outer marginal area of the cover and the retaining portions, the retaining portions being adapted to coact with the ring simulating member for sustaining both the cover and the ring members in assembly with the wheel.

10. A wheel cover member for overlying disposition upon a wheel, the cover member having an outer marginal cover area provided with circumferentially spaced retaining portions disposed radially outwardly of the outer marginal area with the retaining portions having a diameter slightly smaller than the inside diameter of the terminal rim flange of a tire rim so as to lie in radially spaced relation when the cover member is applied against the wheel, said retaining portions not only disposed radially outwardly of the outer marginal area of the cover member but additionally being disposed substantially in their entirety on the axially outer side of the cover, said retaining portions each including a pry-off extension with the retaining portion and its pry-off extension being of a generally S-shaped cross-section, and a non-metallic tire side wall ring simulating member having means for engaging the outer marginal area of the cover and the retaining portions, the retaining portions being adapted to coact with the ring simulating member for sustaining both the cover and the ring members in assembly with the wheel.

11. A wheel cover assembly including a wheel cover member for overlying disposition upon a wheel and having an outer marginal cover area provided with circumferentially spaced retaining portions disposed radially outwardly of the outer marginal area with the retaining portions having a diameter slightly smaller than the inside diameter of the terminal rim flange of a tire rim so as to lie in radially spaced relation when the cover member is applied against the wheel, and a non-metallic tire sidewall ring member having a radial dimension so as to extend over the terminal rim flange as well as a portion of the tire side wall and also having a bifurcated radially inner marginal area elastically stretched over and retainingly engaged in assembly at the outer marginal cover area with circumferentially spaced retaining portions, the bifurcated radially inner marginal area including a pocket area with the retaining portions disposed therein and with the inner marginal area further having a curved surface area for nested engagement with an inside curved surface of a terminal rim flange so said retaining portions can exert a radial force to sustain the cover member as well as the ring member in assembly on a terminal rim flange.

12. A wheel cover assembly including a wheel cover member for overlying disposition upon a wheel and having an outer marginal cover area provided with circumferentially spaced retaining portions disposed radially outwardly of the outer marginal area with the retaining portions having a diameter slightly smaller than the inside diameter of the terminal rim flange of a tire rim so as to lie in radially spaced relation when the cover member is applied against the wheel, and a non-metallic tire sidewall ring member having a radial dimension so as to extend over the terminal rim flange as well as a portion of the tire side wall and also having a bifurcated radially inner marginal area elastically stretched over and retainingly engaged in assembly at the outer marginal cover area with circumferentially spaced retaining portions, said retaining portions each including a pry-off extension with the retaining portion and its pry-off extension being of a generally S-shaped cross-section, said ring member having radially extending channels radially aligned with the pry-off extension for receipt of a pry-off tool.

13. In a wheel structure including a tire rim having an axially extending terminal rim flange, a wheel cover assembly including a wheel cover member for overlying disposition upon the tire rim and having an outer marginal cover area provided with circumferentially spaced retaining portions disposed radially outwardly of the outer marginal area with the retaining portions having a diameter slightly smaller than the inside diameter of the terminal rim flange so as to lie in radially spaced relation to the terminal rim flange as well as a portion of a tire side wall, the side wall ring member having an inner margin engaged with the terminal rim flange and provided with a grooved area, and with the circumferentially spaced retaining portions on the cover being engaged in said grooved area and which circumferentially spaced retaining portions coact with the grooved area and the terminal rim flange to maintain both the cover member and the ring member in assembly with the vehicle wheel.

References Cited in the file of this patent

UNITED STATES PATENTS

| | | |
|---|---|---|
| 2,368,246 | Lyon | Jan. 30, 1945 |
| 2,443,627 | Lyon | June 22, 1948 |
| 2,522,039 | Jacobsen et al. | Sept. 12, 1950 |
| 2,618,513 | Horn | Nov. 18, 1952 |
| 2,624,638 | Lyon | Jan. 6, 1953 |
| 2,669,487 | Horn | Feb. 16, 1954 |
| 2,736,610 | Waite | Feb. 28, 1956 |
| 2,812,215 | Waite | Nov. 5, 1957 |
| 2,822,016 | Billingsley | Feb. 4, 1958 |
| 2,822,219 | Billingsley | Feb. 4, 1958 |
| 2,862,769 | Wood | Dec. 2, 1958 |
| 2,881,027 | Lyon | Apr. 7, 1959 |
| 2,937,426 | Barnes | May 24, 1960 |
| 2,937,904 | Barnes | May 24, 1960 |

FOREIGN PATENTS

| | | |
|---|---|---|
| 1,061,278 | France | Nov. 23, 1953 |